United States Patent [19]

Ueda et al.

[11] Patent Number: 5,295,343
[45] Date of Patent: Mar. 22, 1994

[54] APPARATUS FOR SEALING CONTAINERS

[75] Inventors: Michio Ueda; Tetsuya Iuchi; Masao Nobuta; Tadashi Mifune; Seiji Hashimoto, all of Itano, Japan

[73] Assignee: Shikoku Kakoki Co., Ltd., Itano, Japan

[21] Appl. No.: 27,491

[22] Filed: Mar. 5, 1993

[30] Foreign Application Priority Data

Mar. 6, 1992 [JP] Japan .................. 4-011440[U]

[51] Int. Cl.⁵ .................. B65B 7/28; B65B 61/06
[52] U.S. Cl. .................. 53/329.5; 53/373.4; 53/389.3
[58] Field of Search .................. 53/329, 329.2, 329.3, 53/329.5, 389.3, 373.4

[56] References Cited

U.S. PATENT DOCUMENTS

| | | | |
|---|---|---|---|
| 2,078,314 | 4/1943 | Busche | 53/329.5 |
| 2,864,221 | 12/1958 | Jones, Jr. et al. | 53/329.5 |
| 3,491,510 | 1/1970 | Sternau | 53/329 X |
| 3,685,251 | 8/1972 | Mahaffy et al. | 53/329.5 X |
| 3,792,566 | 2/1974 | Kinney | 53/329.5 X |
| 3,792,567 | 2/1974 | Balcome | 53/329 |
| 3,884,017 | 5/1975 | Butcher | 53/329 X |

FOREIGN PATENT DOCUMENTS 1341605 9/1963 France .

Primary Examiner—Horace M. Culver
Attorney, Agent, or Firm—Armstrong, Westerman, Hattori, McLeland & Naughton

[57] ABSTRACT

A container sealing apparatus comprising a conveyor for transporting containers, a sealer for sealing an opening edge portion of each of the containers with a closure material supplied adjacent to the container during transport by the conveyor, and a trimmer for blanking out a closure from the closure material affixed to the container, along the edge portion, the trimmer having a lifter for lifting the container from a path of transport of the container, a holder having a support for supporting the edge portion of the container lifted by the lifter and a cutter clearance groove formed externally of the support, and a cutter movable upward and downward so as to bring a cutting edge thereof into and out of the groove.

5 Claims, 11 Drawing Sheets

APPARATUS FOR SEALING CONTAINERS

BACKGROUND OF THE INVENTION

The present invention relates to an apparatus for sealing the openings of cuplike containers with a strip of closure material, for example, with a dessert accommodated in the containers.

Already known as such apparatus are those comprising a conveyor having a plurality of container holder plates and intermittently drivable for transporting the holder plates so as to stop the holder plates successively at a sealing station, a feeder for feeding a strip of closure material to the sealing station, a sealer for affixing the closure material to the opening edge portion of each container at the sealing station, and a trimmer having a cutter for blanking out a closure from the closure material affixed to the container, along the container opening edge portion, each of the holder plates being formed with a clearance groove for rendering the cutter free from contact with the plate when blanking out the closure.

The apparatus described has the problem that the holder plate has the cutter clearance groove and therefore can not be cleaned effectively. Furthermore, the need to form the clearance groove in each of the plurality of holder plates results in an increased machining cost. If the holder plate is reduced in thickness to decrease the material cost, the holder plate can not be grooved, so that the reduction in the thickness of the holder plate is limited.

SUMMARY OF THE INVENTION

The main object of the present invention is to provide a container sealing apparatus free of the above problems.

The present invention provides an apparatus for sealing containers which comprises conveyor means for transporting the containers, sealing means for sealing an opening edge portion of each of the containers with a closure material supplied to the container during transport by the conveyor means, and trimming means for blanking out a closure from the closure material affixed to the container, along the container opening edge portion, the trimming means having a lifter for lifting the container from a path of transport of the container, a holder having a support for supporting the opening edge portion of the container lifted by the lifter and a cutter clearance groove formed externally of the support, and a cutter movable upward and downward so as to bring a cutting edge thereof into and out of the cutter clearance groove.

With the container sealing apparatus of the present invention, the holder is formed with the clearance groove for rendering the cutter free from contact with the holder, so that there is no need to form such a clearance groove in the container holders of the conveyor means. Accordingly, the container holders of the conveyor means can be cleaned satisfactorily, can be prepared less expensively than when cutter clearance grooves are formed therein and can be decreased in thickness to achieve a reduction in the material cost.

DESCRIPTION OF THE PREFERRED EMBODIMENTS

Embodiments of the present invention will be described below with reference to the drawings. In the following description, the term "front" refers to the direction in which containers are transported (the right-hand side of FIG. 1), the term "rear" to a direction opposite to this direction, and the terms "right" and "left" are used as the apparatus is seen toward the rear. In some of the drawings, the direction toward the front or the forward direction is indicated by an arrow.

Figure 2:
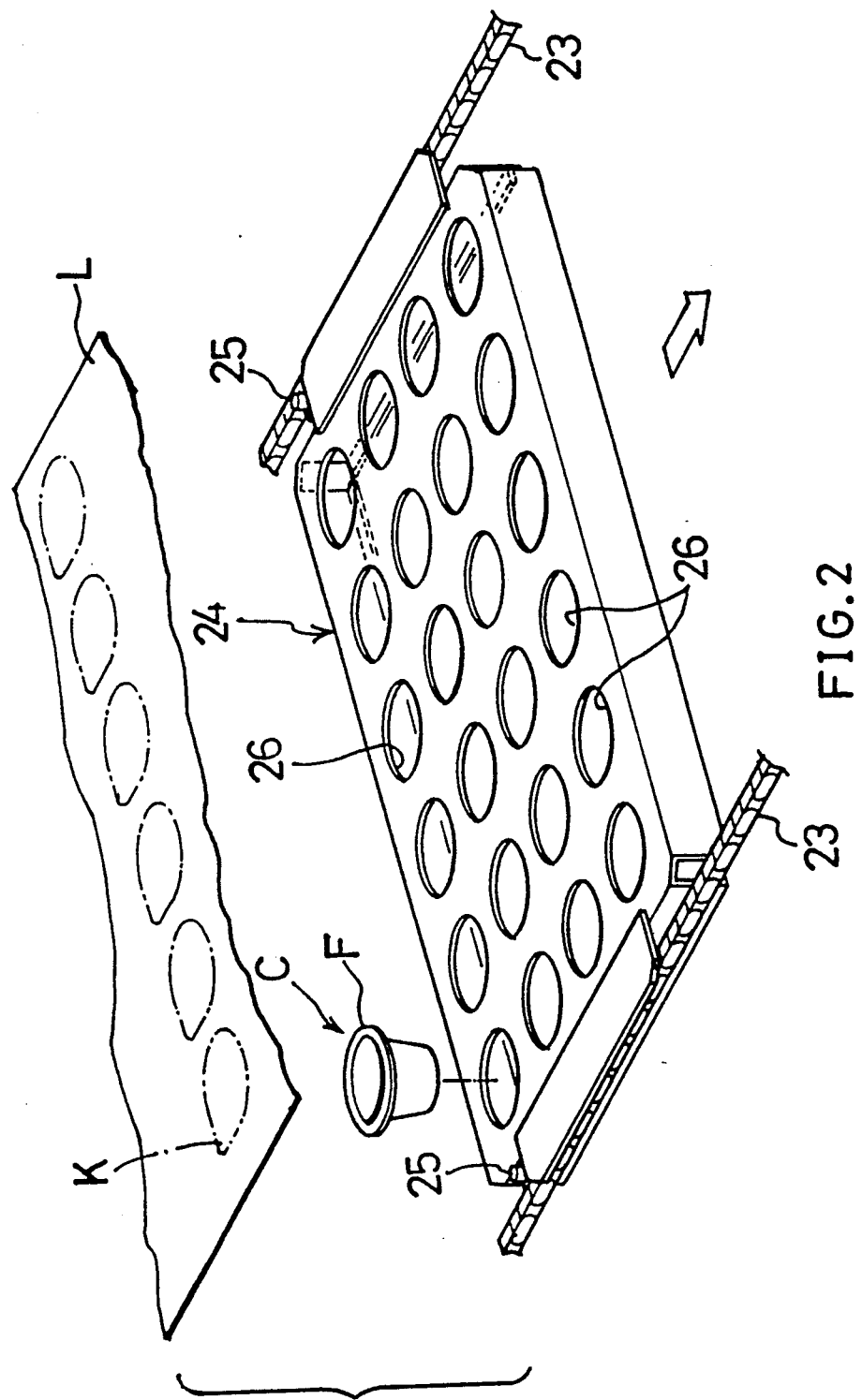
FIG. 2 is a perspective view of a container transport tray.

With reference to FIG. 2, containers C are prepared from a heat-sealable plastics in the form of a cup and each have a flange F at the opening edge portion thereof. A closure material L is made of a heat-sealable plastics film and is supplied to a sealing apparatus in the form of a roll. As indicated in broken lines in FIG. 2, the closures to be blanked out from the closure material L each have a tab K projecting from a portion of a circular outer periphery along the outer periphery of the flange F.

Figure 1:
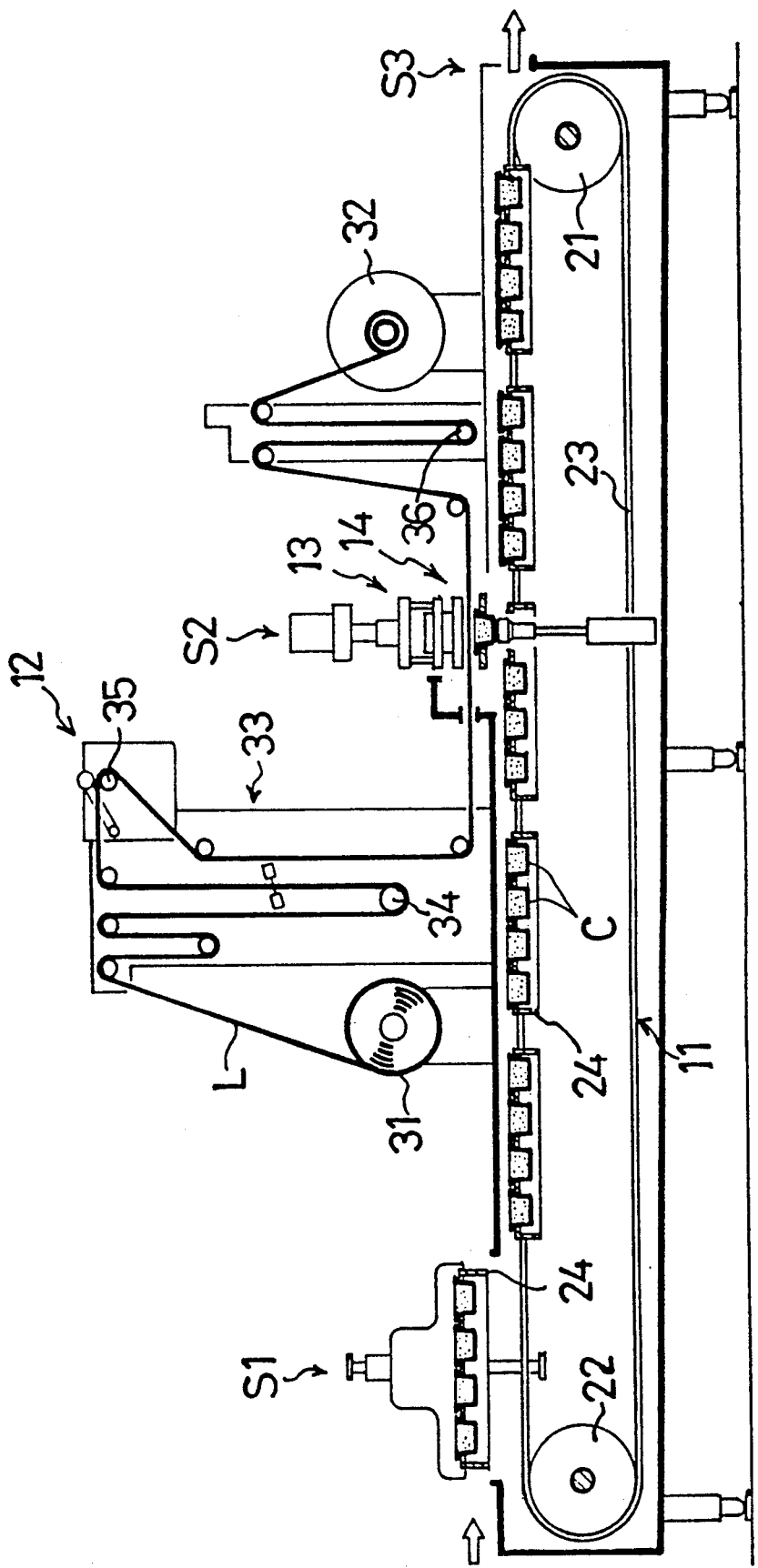
FIG. 1 is an overall diagram showing an apparatus embodying the invention.

The container sealing apparatus shown in FIG. 1 comprises a conveyor 11 for transporting containers C via a feed station S1, then a sealing station S2 and thereafter a discharge station S3, a transport device 12 for paying off the closure material L from the roll and transporting the material via the sealing station S2, a sealing device 13 disposed at the sealing station S2 and a trimming device 14 disposed at the sealing station S2 in combination with the sealing device 13.

The conveyor 11 comprises a pair of front drive sprocket 21 and rear driven sprocket 22 arranged at each of right and left sides, an endless chain 23 reeved around the pair of sprockets 21, 22, and trays 24 mounted on and provided between the chains 23.

With reference to FIG. 2, the chain 23 has claws 25 arranged at a predetermined spacing. The tray 24 is pushed forward by claws 25 in engagement therewith. The tray 23 is formed with six rows of container retaining holes 26 arranged in the right-to-left direction and each including four holes 26 as arranged longitudinally of the conveyor 11.

With reference to FIG. 1 again, the transport device 12 comprises a rewinder 31 disposed to the rear of the sealing station S2, a winder 32 disposed in front of the sealing station S2, and a group of rolls 33 for paying off the closure material L from the rewinder 31, passing the paid-off closure material L through the sealing station S2 at a position above the path of transport of containers and thereafter guiding the material L to the winder 32. The roll group 33 includes a rear dancer roll 34 and a feed roll 35 which are arranged at intermediate portions of the path of transport of the material L from the rewinder 31 to the sealing station S2, and a front dancer roll 36 disposed at an intermediate portion of the path of transport of the material L from the station S2 to the winder 32. Although not described in detail, the roll group 33 includes guide rolls arranged at suitable portions of the path of transport of the closure material. The feed roll 35 is driven by unillustrated drive means so as to vary the amount of feed of the material L.

With reference to FIGS. 3 to 6, a horizontal support plate 41 having container inserting apertures is fixedly provided between the path of transport of containers and the path of transport of the closure material at the sealing station S2. Right and left posts 42 are provided upright at opposite ends of the support plate 41, and a movable top plate 43 extends over and is supported by the upper ends of the posts 42. The left end of the top plate 43 rests on the left post 42, while the right end of the plate 43 is connected to the right post 42 by a horizontal pin 44. A top plate opening cylinder 45 is attached to the right end of the support plate 41 and has a rod connected to the right end of the top plate 43.

A container lifter 46 is provided under the support plate 41, while a container holder 47 is disposed on the upper side of the support plate 41. Mounted on the upper surface of the top plate 43 are three head lifting cylinders 48 each having a rod projecting downward through the top plate 43. Three sealing heads 49 are attached to the respective rod projecting ends. On each of the right and left side of each cylinder 48, a rod guide sleeve 51 extends through the top plate 43 and has a vertical head guide rod 52 removably inserted therethrough.

The container lifter 46 comprises a horizontal lift bar 53 extending transversely of the path of transport of containers under the support plate 41, overstroke cylinders 54 provided between the support plate 41 and the lift bar 53 at their right and left ends, six container lifting cylinders 55 attached as directed upward to the underside of the lift bar 53 in corresponding relation to the respective rows of containers to be transported and each having a rod projecting upward through the lift bar 53, and suction members 56 attached to the projecting rod ends of the respective cylinders 55.

The container holder 47 comprises a pair of right and left guide rods 57 mounted on the upper side of the support plate 41 close to their respective ends and extending longitudinally of the path of transport, and a pair of front and rear divided holder plates 58 movable toward or away from each other and slidably supported by these guide rods 57.

Figure 3:
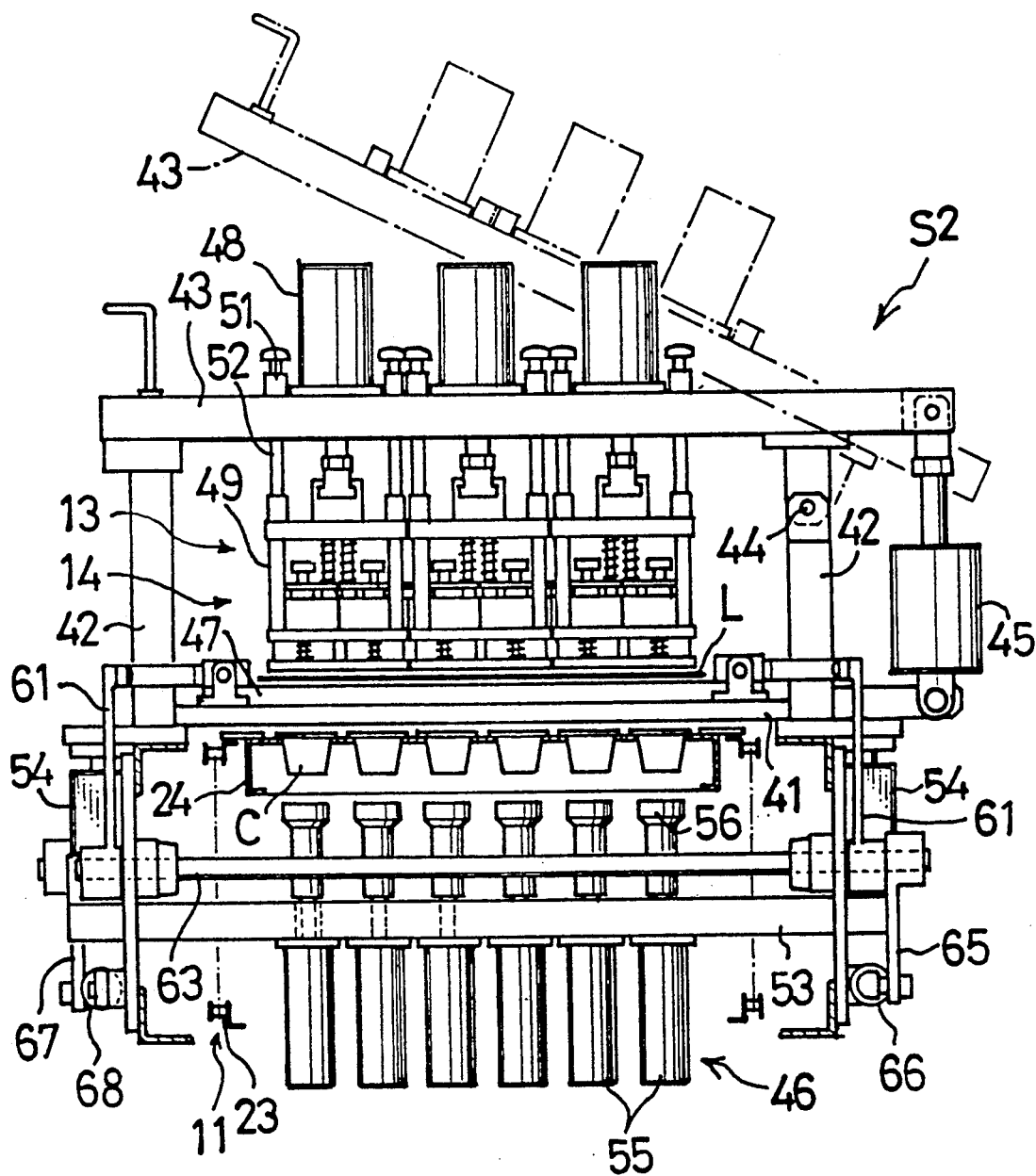
FIG. 3 is a cross sectional view showing a sealing station of the apparatus.
Figure 4:
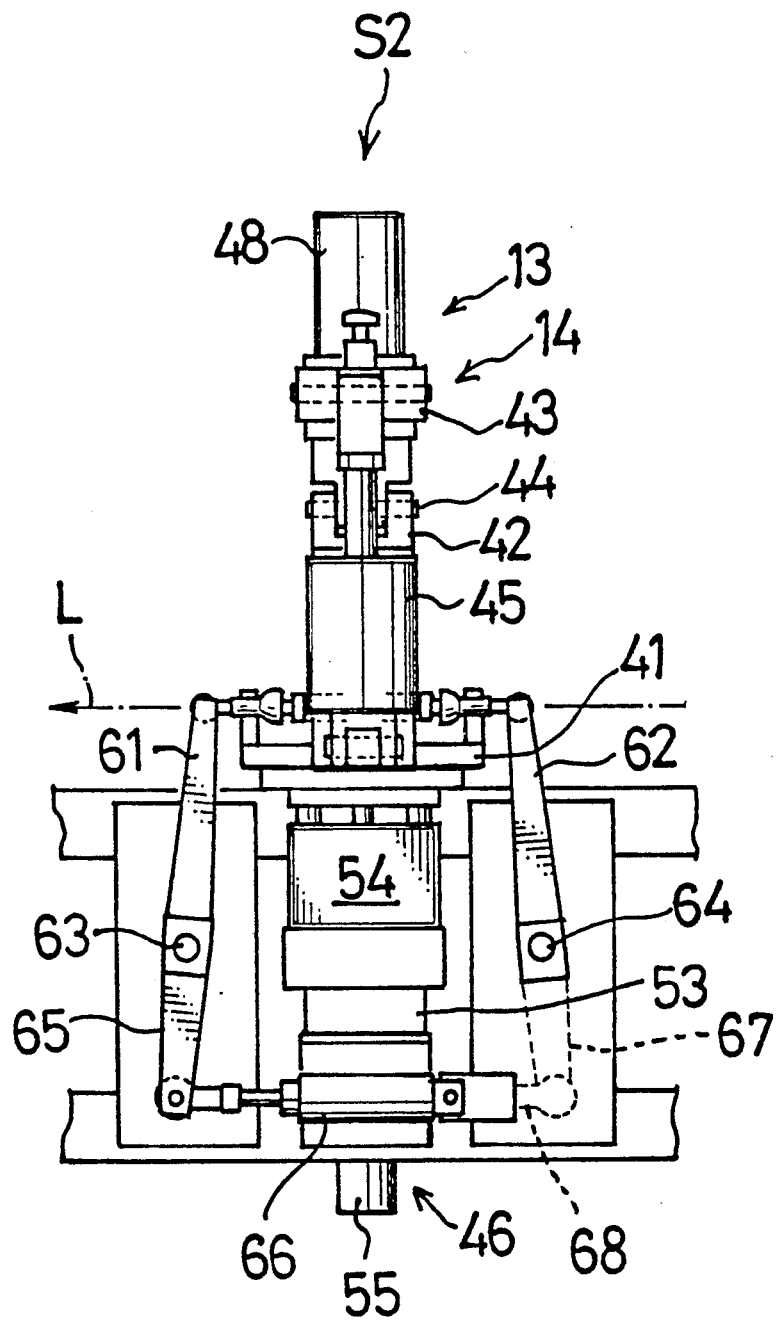
FIG. 4 is a side elevation showing the sealing station of the apparatus.
Figure 5:
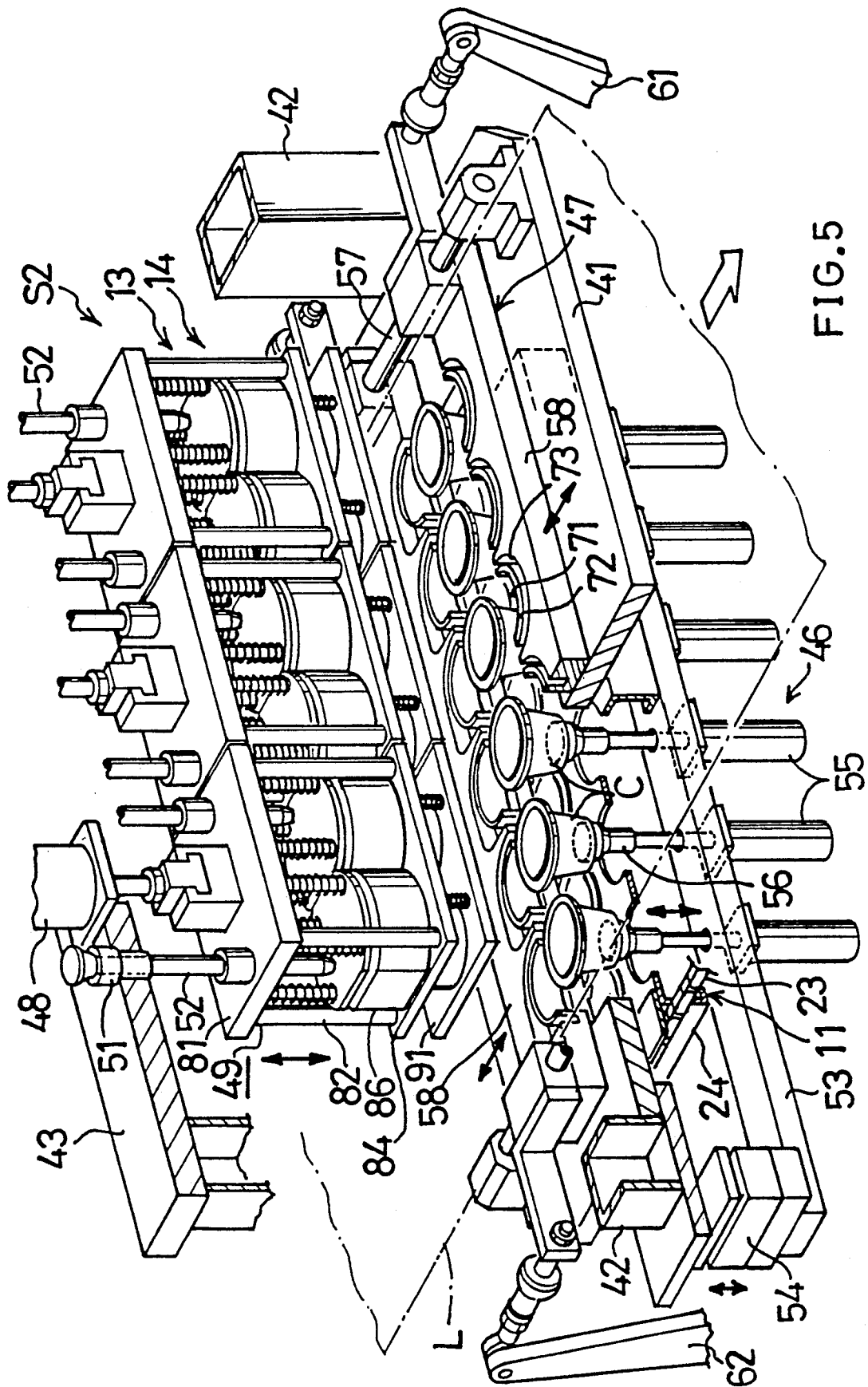
FIG. 5 is a perspective view partly broken away and showing the sealing station of the apparatus.
Figure 6:
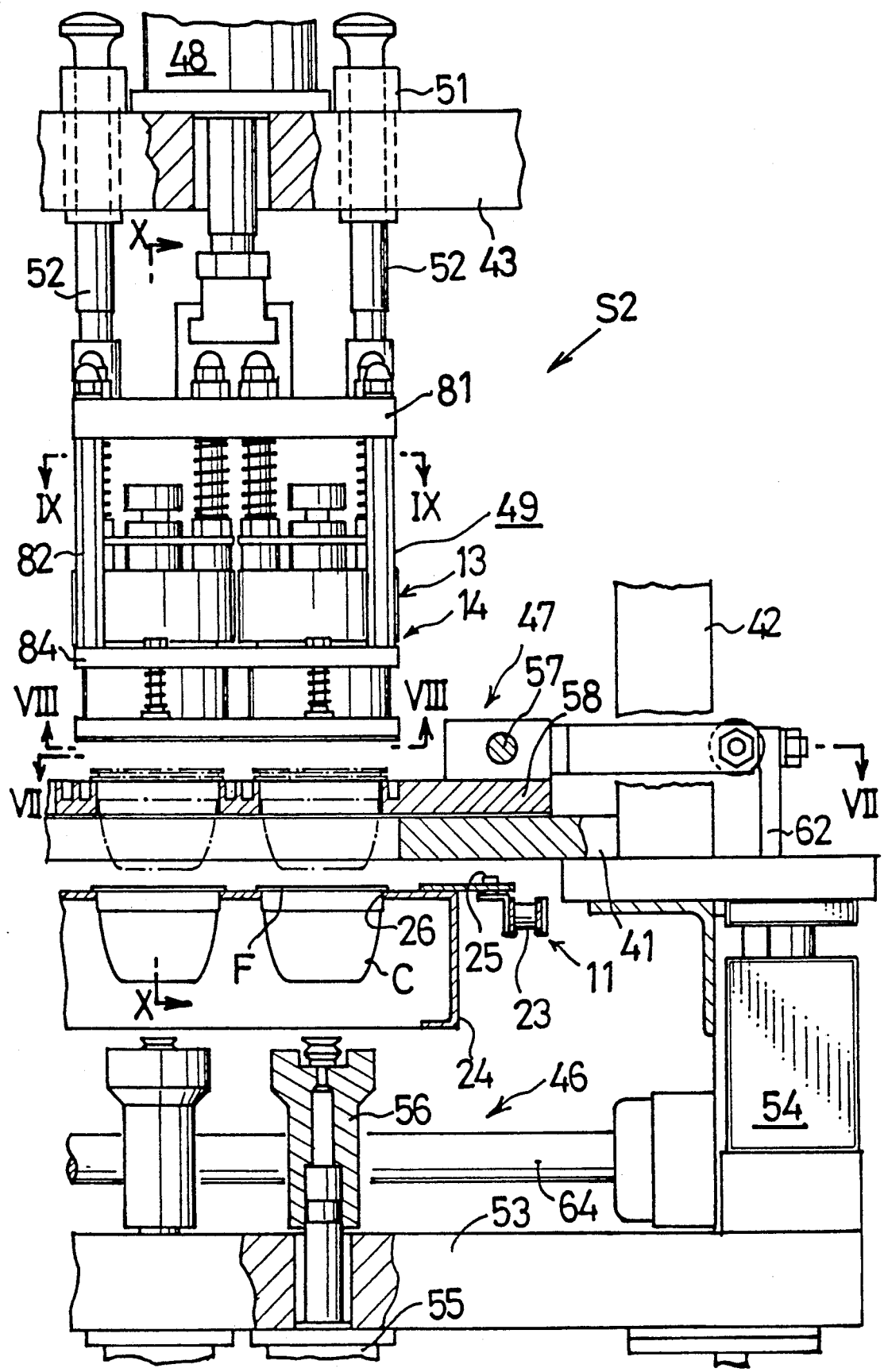
FIG. 6 is an enlarged fragmentary view in cross section of the sealing station of the apparatus.

A pair of front and rear driven arms 61, 62 is connected to each of opposite ends of the holder plate pair 58. With reference to FIG. 3 and FIG. 4 (in opposite relation to other drawings with respect to the front-to-rear direction), the front driven arm 61 is fixed to a front rotatable shaft 63, and the rear driven arm 62 to a rear rotatable shaft 64. A front drive arm 65 is secured to the right end of the front shaft 63 and has the rod of a holder opening cylinder 63 connected thereto. A rear drive arm 67 is secured to the right end of the rear shaft 64 and has the rod of a holder opening cylinder 68 connected thereto. The cylinders 66 and 68 are oriented forward and rearward, respectively.

Figure 7:
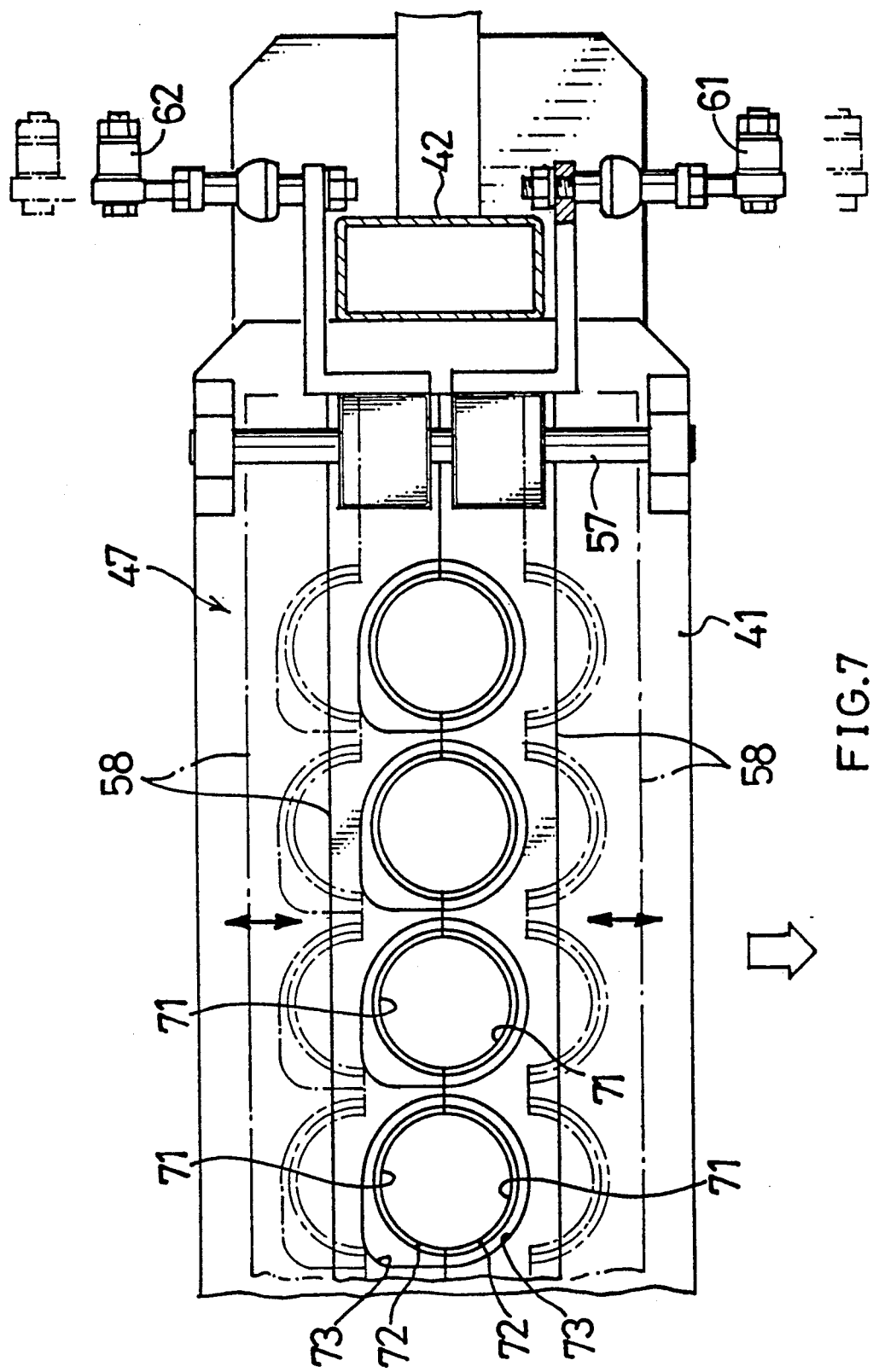
FIG. 7 is a view in section taken along the line VII—VII in FIG. 6.

As will be most apparent from FIG. 7, the opposed sides of the two holder plates 58 are formed with six pairs of semicircular cutouts 71 corresponding to the respective rows of containers to be transported, the cutouts of each pair being opposed to each other. The cutouts 71 of each pair form a circular container retaining aperture when combined together. The upper edge of each holder plate 58 defining the cutout 71 provides a container flange support 72, and a cutter clearance groove 73 is formed in the plate upper surface around the support 72 externally thereof. When the two holder plates 58 are joined together by being closed, the flange support 72 is in the form of a circular ring having a flat upper surface. The cutter clearance groove 73 is then defined by a circular inner side face extending along the outer periphery of the flange support 72 and by an outer side face partly bulging in conformity with the shape of the closure described.

Figure 10:
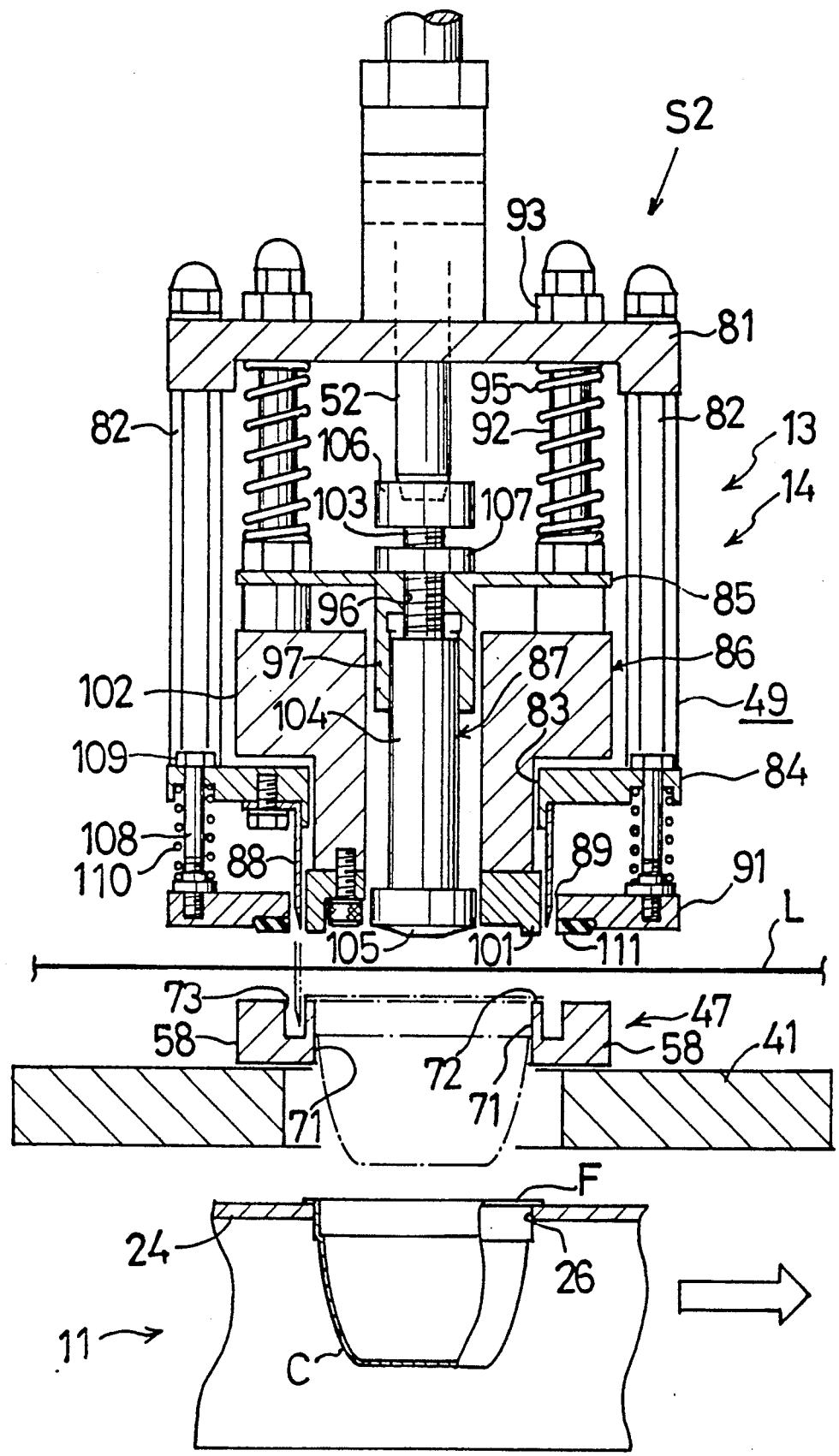
FIG. 10 is a view in section taken along the line X—X in FIG. 6.

As best shown in FIG. 10 in detail, each sealing head 49 comprises an upper lift plate 81 removably connected to the rod of the head lifting cylinder 48 by a coupling and having two head guide rods 52 slidably extending therethrough, a lower lift plate 84 positioned at a predetermined distance downward from the upper lift plate 81, suspended therefrom by connecting rods 82 extending from peripheral portions of the plate 81 and having two heater inserting holes 83 as arranged side by side, two press plates 85 arranged side by side at an intermediate level between the two lift plates 81, 84 and elastically suspended from the upper lift plate 81, two tubular heaters 86 suspended from the respective press plates 85 and each having a small-diameter portion inserted through the hole 83, two closure material pushing-in members 87 each in the form of a vertical rod and suspended from the press plate 85 so as to be accommodated in the heater 86, two tubular cutters 88 each attached as projected downward to the edge portion of the lower lift plate 84 defining the heater inserting hole 83 so as to surround the small-diameter portion of the heater 86 with a small clearance formed therebetween, and a closure material holder 91 elastically suspended from the lower lift plate 84 and formed with two cutter inserting holes 89 with the cutter 88 inserted in each hole 89.

Upper guide rods 92 are provided upright on outer peripheral portions of each press plate 85. Each upper guide rod 92 slidably extends through the upper lift plate 81 to project upward beyond the plate 81 and has an upper stopper 93 at the projecting end. An upper compression spring 95 is provided around the guide rod 92 between the upper lift plate 81 and the press plate 85. The press plate 85 is centrally formed with a threaded bore 96, and a downwardly extending guide sleeve 97 is integral with the bored portion.

The heater 86 comprises a replaceable heat ring 101, and a heater body 102 having the ring 101 removably attached to its lower end and an unillustrated electric heating wire embedded therein.

The closure material pushing-in member 87 has a small-diameter screw portion 103 screwed in the threaded bore 96, a solid cylinder portion 104 having a medium diameter and slidably fitted into the guide sleeve 97, and a large-diameter press portion 105, these portions 103 to 105 being arranged from above downward. The screw portion 103 projects upward beyond the press plate 85 and carries a knob 106 secured to the projecting end and a level adjusting nut 107 screwed thereon below the knob 106. The press portion 105 has a convex bottom face.

Lower guide rods 108 are provided upright on outer peripheral portions of the closure material holder 91. Each lower guide rod 108 slidably extends through the lower lift plate 84 to project upward beyond the plate 84 and has a lower stopper 109 at its projecting end. A lower compression spring 110 fitted around the rod 108 is interposed between the lower lift plate 84 and the closure material holder 91. An elastic material 111 is affixed to the lower surface of the holder 91 around each cutter inserting hole 89.

Figure 8:
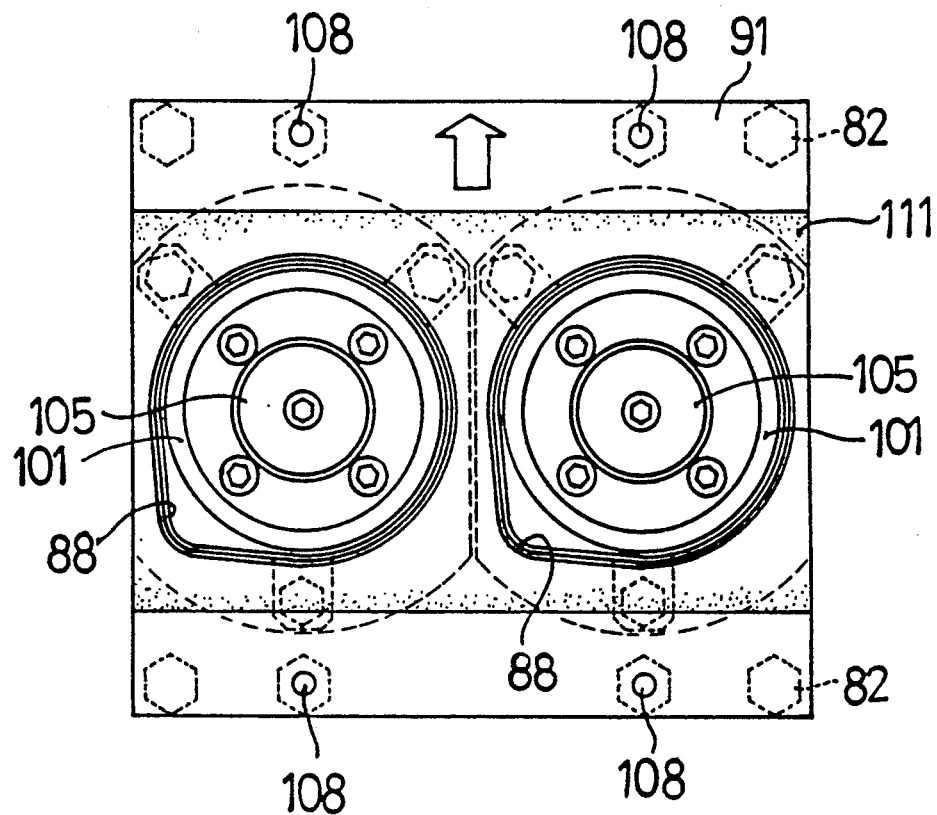
FIG. 8 is a view in section taken along the line VIII—VIII in FIG. 6.
Figure 9:
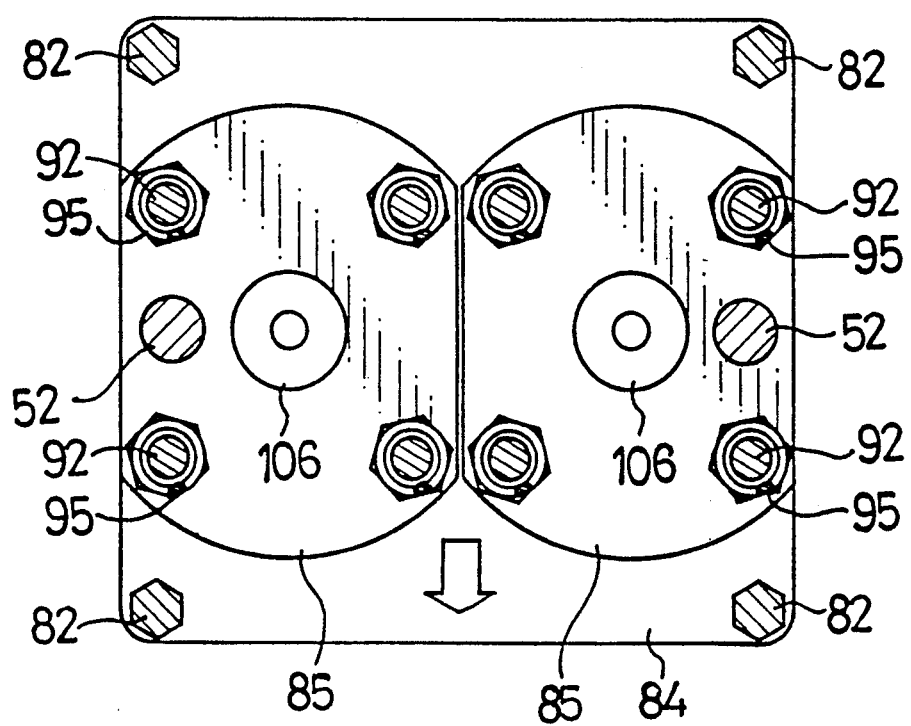
FIG. 9 is a view in section taken along the line IX—IX in FIG. 6.

As shown in FIG. 8, the heat ring 101 has an annular lower surface having a larger width than the flange support 72, while the cutting edge of the cutter 88 at its lower end has a circular form partly deformed in conformity with the shape of the outer side face defining the cutter clearance groove 73. The lower surface of the heat ring 88 is at the same level as that of the elastic material 111, but the cutting edge of the cutter 88 is at a level about 1 to about 2 mm higher than this level.

Now suppose the suction members 56 are at their lower limit position, the holder plates 58 are open, and the sealing heads 49 are in their upper limit position.

In this state, containers C placed on the tray 24 are transported to the sealing station S2, whereupon the overstroke cylinders 54 and the container lifting cylinders 55 are operated at the same time to raise the suction members 56. When the suction members 56 have been raised to their upper limit position, the flanges F of the containers C on the suction members 56 are at a level higher than the upper surfaces of the holder plates 58 by a distance corresponding to the stroke length of the overstroke cylinders 54. When the holder opening cylinders 66, 68 are operated in this state to close the holder plates 58, the containers C are held between the opposed cutout portions 71 of the holder plates 58, whereby the position of the containers C is determined. The overstroke cylinders 54 only are then operated to lower the suction members 56 by the distance corresponding to the stroke length, whereupon the flanges F of the containers C rest on the respective flange supports 72.

Simultaneously with or before or after the transport of containers C to the sealing station S2, the closure material L is driven by one pitch by the operation of the feed roll 35, whereby the portions of the material L to be blanked out are brought to the sealing station S2.

Next, the head lifting cylinders 48 are operated to lower the sealing heads 49. When each of the sealing heads 49 has lowered nearly to its lower limit position, the closure material pushing-in member 87 first holds the center of the portion of the closure material L to be applied to recess this portion to a downwardly bulging curved form, whereby air is forced out from inside the container C to diminish the head space (unfilled space) within the container.

Subsequently, each heat ring 101 presses the closure material L and the container flange F against the flange support 72, and the closure material holder 91 immediately thereafter holds the material L over an outside area around the portion thereof to be blanked out, whereby the closure material L is affixed to the flange F by heat sealing.

Compression of the upper and lower springs 95, 110 permits the sealing head 49 to further lower to blank out a closure from the material L with each cutter 88. After blanking, the edge of the cutter 88 is inserted into the clearance groove 73 to avoid the interference of the holder plates 58 with the cutter 88. After the closure material L has been punched, the sealing head 49 is reversely moved to rise.

Upon the rise of the sealing head 49, the closure blanked out remains on the container C, while the remaining portion of the punched closure material L leaves the container C. Accordingly, the closure material L is freely transported independently of the transport of containers C when to be transported in the next cycle.

When the top plate opening cylinder 45 in the state shown in FIG. 3 is operated to retract its rod, the top plate 43 is raised to the broken-line position shown in FIG. 3. The sealing heads 49 can be replaced by other sealing heads when the guide rods 52 are removed from the guide sleeves 51 of the stop plate 43 in this position to disconnect the sealing heads 49 from the rods 52.

If the air within the container C expands when heated by heat sealing, the closure material L affixed to the container will inflate upward. If the head space is large, the amount of expansion will be great, possibly causing the closure portion to separate off. Accordingly, the head space is diminished before heat sealing to obviate the likelihood of the closure portion separating off.

The diminution of the head space is dependent on the amount of projection of the lower end of the closure material pushing-in member 87 from the lower surface of the heat ring 101. Usually, the amount is about 1 to about 2 mm. The amount of projection of the pushing-in member 87 is variable by altering the level of the member 87. The level is altered by loosening the nut 107, rotating the pushing-in member 87 clockwise or counterclockwise and thereafter tightening up the nut 107.

Even if the container is filled with contents with no head space left inside the container, use of the pushing-in member causes the contents to spill over the container immediately before sealing, whereby air bubbles, even if present in the contents, can be discharged to make the contents free from bubbles before sealing.

Figure 11:
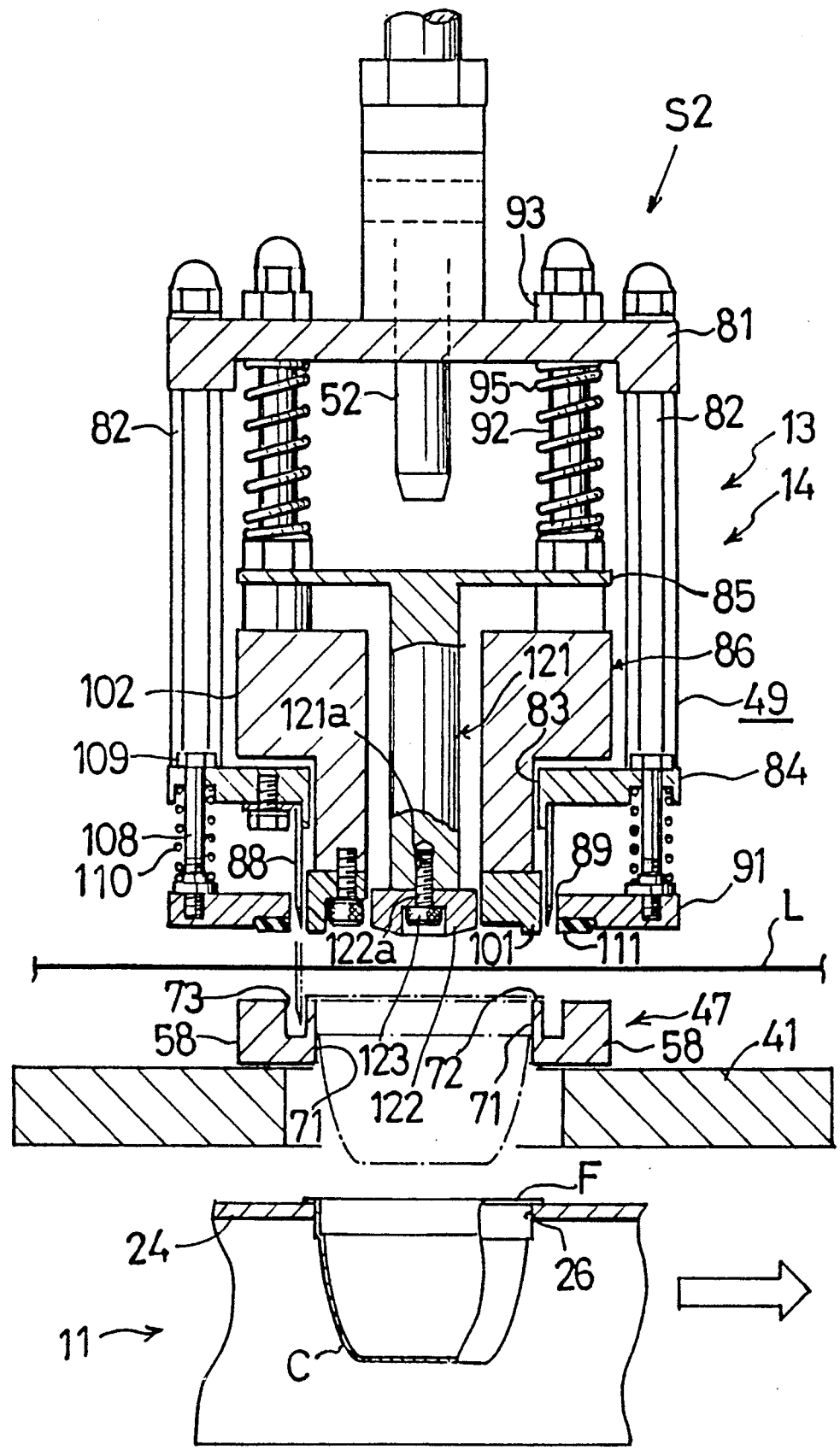
FIG. 11 is a sectional view corresponding to FIG. 10 and showing another embodiment.

FIG. 11 shows a modification of the closure material pushing-in member. With this modification, a suspending rod 121 extends downward from the lower surface of the press plate 85 integrally therewith, and a closure material pushing-in member 122 in the form of a disk is removably fastened to the lower end of the rod 121 by a bolt 123. An upward threaded bore 121a is formed in the lower end face of the suspending rod 121, while the pushing-in member 122 is formed with a stepped bolt hole 122a for concealing the head of the bolt 123.

Figure 12A:
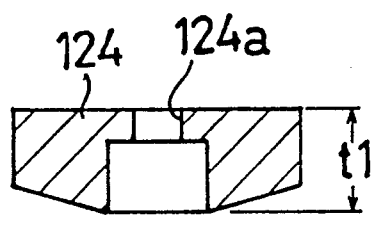
FIG. 12 includes sectional views of closure material pushing-in members of different heights.
Figure 12B:
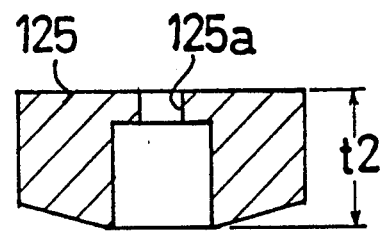

In addition to the pushing-in member 122, other different closure material pushing-in members 124, 125 are prepared which have different heights t1 and t2, respectively, as shown in FIG. 12. One of these members is selectively used in accordance with the desired level. The pushing-in members 124, 125 are also formed with bolt holes 124a, 125a.

What is claimed is:
1. An apparatus for sealing containers comprising:
   conveyor means for transporting the containers,
   sealing means for sealing an opening edge portion of each of the containers with a closure material supplied adjacent to the container during transport by the conveyor means, and
   trimming means for blanking out a closure from the closure material affixed to the container, along the container opening edge portion, the trimming means having a lifter for lifting the container from a path of transport of the container, a holder having a support for supporting the opening edge portion of the container lifted by the lifter and a cutter clearance groove formed externally of the support, and a cutter movable upward and downward so as to bring a cutting edge thereof into and out of the cutter clearance groove.

2. An apparatus as defined in claim 1 wherein the conveyor means comprises a pair of endless chains arranged at opposite sides of the path of transport, and a plurality of trays mounted on and provided between the two chains, each of the trays being formed with at least one container retaining hole.

3. An apparatus as defined in claim 1 wherein the sealing means has a sealing head movable upward and downward so as to press the closure material against the opening edge portion of the container lifted by the lifter, and the cutter is attached to the sealing head.

4. An apparatus as defined in claim 3 wherein the sealing head comprises a head lifting hydraulic cylinder disposed above the sealing station and directed vertically downward, an upper lift plate connected to a piston rod of the cylinder, a lower lift plate suspended from the upper lift plate by connecting rods and formed with a heater inserting hole, a press plate disposed at an intermediate level between the two lift plates and elastically suspended from the upper lift plate, a heater attached to the press plate in suspension and having a lower portion inserted through the heater inserting hole, and a closure material holder elastically suspended from the lower lift plate and surrounding the heater lower portion, and the cutter extends downward from an edge portion of the lower lift plate defining the heater inserting hole and has a cutting edge positioned between the heater and the closure material holder to project therebelow.

5. An apparatus as defined in claim 1 wherein the holder comprises a pair of horizontal guide rods extending in parallel to the path of transport of the container, a pair of divided movable holder plates slidably supported by the guide rods, and means for moving the holder plates toward or away from each other, the holder plates being formed in opposed faces thereof with a cutout for forming a container retaining hole when the holder plates are joined together, the support and the cutter clearance groove being formed in the upper surfaces of the holder plates.

* * * * *